Aug. 27, 1929.   H. E. GROSS ET AL   1,726,347
MANUFACTURE OF BUTTWELD PIPES
Filed March 31, 1927   6 Sheets-Sheet 3

INVENTORS
Harry E. Gross
Ottmar M. Tishlarich
by their attorneys
Byrnes, Stebbins & Parmelee Aug. 27, 1929.   H. E. GROSS ET AL   1,726,347
MANUFACTURE OF BUTTWELD PIPES
Filed March 31, 1927   6 Sheets-Sheet 4

INVENTORS

Aug. 27, 1929.  H. E. GROSS ET AL  1,726,347
MANUFACTURE OF BUTTWELD PIPES
Filed March 31, 1927   6 Sheets-Sheet 5

INVENTORS
Harry E. Gross
Ottmar M. Dishlarich
by their attorneys
Byrnes, Stebbins & Parmelee Patented Aug. 27, 1929.

1,726,347

UNITED STATES PATENT OFFICE.

HARRY E. GROSS, OF DORMONT, AND OTTMAR M. TISHLARICH, OF BELLEVUE, PENNSYLVANIA, ASSIGNORS TO A. M. BYERS COMPANY, OF PITTSBURGH, PENNSYLVANIA, A CORPORATION OF PENNSYLVANIA.

MANUFACTURE OF BUTT-WELD PIPES.

Application filed March 31, 1927. Serial No. 179,856.

This invention relates to the manufacture of buttweld pipes, also known as bellweld pipes, and more especially to a method and apparatus for the rapid production of pipe according to the buttweld process.

In the manufacture of pipes or tubes from flat strips of metal, commonly referred to as skelp, either of two methods are resorted to. One of these methods is known as the lapweld while the other is known as the buttweld or bellweld method.

In the manufacture of tubing, according to the lapweld process, the skelp is first introduced into a heating furnace, and on reaching the proper temperature it is pulled by means of tongs through a bending die. The die forms the skelp into a cylindrical or tubular shape, lapping the edges of the skelp over each other. While the lapped skelp is still hot, it is introduced into a heating furnace, and upon reaching a welding temperature, it is pushed through a pair of welding rolls. The welding rolls are arranged to operate in conjunction with a pipe ball and bar, the ball being supported by the bar in the pass of the rolls. As the lapped-over skelp passes through the welding rolls over the pipe ball at welding temperature, the pressure of the rolls causes the lapped edges of the skelp to be welded. The resulting piece of hot pipe which has been thus formed is then conveyed to another pair of rolls of the same general design as the welding rolls and having a pipe ball associated therewith. These rolls are generally referred to either as chill rolls or as smoothing rolls or as blister rolls. After passing through the smoothing rolls, the tube, which has thus been substantially finished both inside and outside by the combined action of the smoothing rolls, is passed through sizing rolls and thence to a cross roll machine for rounding out and straightening the pipe. After leaving the cross rolls, the tubes are processed in the usual way to cool them, straighten them, trim the ends thereof and otherwise treat them as may be desired. It will be noted that in this process the tube is passed one or more times over a pipe ball which serves to maintain the inside diameter of the tube and smooth out any irregularities that may be formed therein.

According to the buttweld process for the manufacture of pipe, the skelp is charged into a furnace. When the skelp has reached a welding temperature, it is pulled out by means of a tong actuated by the drawbench chain through a bell shaped die. Before the strip is charged into the furnace the front ends of the strip are trimmed to provide a taper thereon and this tapered portion first passes through the bell shaped die. As the strip is pulled through the die, it is bent to a circular shape and the edges are brought together with sufficient pressure to effect the welding thereof. When the length of strip has been drawn through the die the tong is released and the pipe falls on to a trough from which it is fed through a sizing roll. From the first sizing roll the pipe is passed through a finishing sizing roll, after which it is delivered to the cooling rack. The cooling rack is flanked on each side by a circular saw which cuts off both ends of the pipe, first the tong end, which was the tapered part of the strip and which is consequently substantially cone shaped, and then the other end of the pipe is trimmed off; this other end, as a rule, not being perfectly welded or finished. The pipe is then delivered to a basket and is ready for the finishing operations, such as inspection, threading, testing, etc. In place of the second sizing rolls, cross rolls are sometimes used.

It will be noted from the foregoing that according to the lapweld process, the interior diameter of the pipe is maintained by reason of a ball, whereas, according to the buttweld process, no ball is used so that the inside diameter of the pipe may not always be maintained, and irregularities may develop therein which are undesirable to the finished product. According to present methods, all buttweld tubing is inspected, and any pieces which show irregularities on the interior thereof are heated again and passed through a pair of smoothing rolls generally similar to the welding rolls used in the lapweld process. These smoothing rolls of course have a ball associated therewith which expands the inside of the pipe to remove irregularities therefrom.

The buttweld method is more rapid than the lapweld method, but it will be obvious that considerable expense and labor is required in the case of such buttweld pipe, the exterior and interior surface of which has been found imperfect, after inspection, due to the additional reheating thereof, and in the passing of the reheated tubes through a pair of smoothing rolls.

The present invention relates primarily to a mill for the manufacture of buttweld pipe wherein the tubes, after being formed, will be passed over a ball in a pair of smoothing rolls so that any irregularities in the inside and outside thereof will be removed before the initial heat of the tube is lost, whereby the present practice of reheating the defective tubes is avoided. This is a considerable departure from the present practice, and is one that results in an improved quality of the pipe at a considerable economy.

This is made possible largely by the provision of means for sawing off the tong end of the pipe immediately after the pipe has been discharged from the drawbench so that the end of the pipe can be freely entered into the roll over a pipe ball. This improvement is also due largely to the provision of two pairs of smoothing rolls for each buttweld furnace, also due to the provision of a sizing roll machine in back of each of the smoothing rolls, or by providing means to convey the pipe from both smoothing rolls to a single sizing roll machine. The pipe can then be passed alternately either through one of the smoothing rolls and its companion sizing rolls, or alternately through either of the two smoothing rolls and one common sizing roll machine. The high speed of production possible with the bellweld process is thus retained while the reheating feature after inspection can be eliminated.

The invention may be readily understood by reference to the accompanying drawings. It will be understood that these drawings are merely illustrative of one embodiment of our invention and that the invention is not restricted to the particular embodiment and arrangement illustrated.

The mill is comprised primarily of apparatus which is now generally familiar to those skilled in the art and which is in common use, such apparatus being arranged and correlated in a new way, and therefore the several parts have only been illustrated more or less diagrammatically and need not be described in detail.

In the drawings, A designates the heating furnace; B the drawbench; C the first receiving trough and sawing unit, which may be followed by a sizing roll machine; D designates a central trough and a manipulator for transferring pipes to other troughs at each side of the manipulator and having an overhead charging mechanism; E designates the succeeding rolling unit; F is the runout troughs, rod runner machine and the associated conveyor; G designates the terminal portion of the conveyor; H, the transfer rack. A second rolling unit consisting of sizing rolls may be provided at J; and K designates the cross rolls, while the cooling rack is designated L.

The furnace A is of the usual type, and the strips of skelp are drawn through the opening 2 thereof through the bell die 3 at the forward end of the drawbench. This is done by means of a tong and chain operating along the drawbench in the usual manner, the run of the chain being indicated at 4. When the welded tubes have been formed they are rolled down the telescoping pipe skids 5 into a trough 7, forming a part of the saw table 7ª. The table 7ª lifts the pipe so as to bring its front or tong end under the action of the saw 6.

Figure 7:
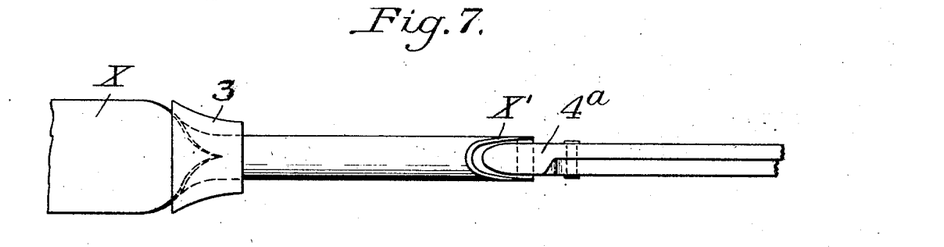
Figure 7 is a detail view illustrating the manner in which the skelp is drawn by a tong through the bell die in the formation of buttweld tube.
Figure 8:
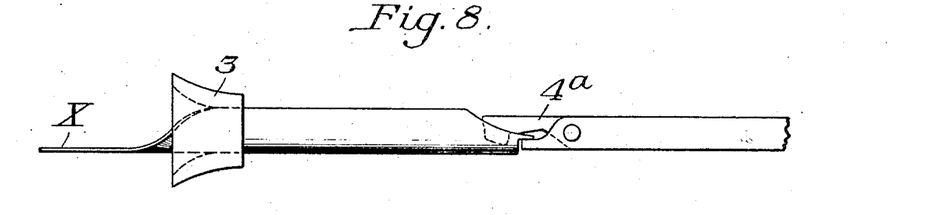
Figure 8 is a side view of the detail shown in Figure 7.

The operation of this saw is to remove the oddly formed forward end of the tube. It has been herein pointed out that in the usual buttweld process, the forward end of the skelp is tapered so that it may be guided into the bell die. This is illustrated in Figures 7 and 8 wherein the strip of skelp is designated "X", while the die 3 is shown apart from the associated structure. The tong is designated 4ª and is made to grip the forward end of the skelp to draw it through the die. The oddly formed or distorted part of the tube is designated X' and it is this portion of the tube which is removed by the cropping saw, which may be of any known or preferred construction.

Adjacent to the saw 6 is a conveyor trough 7. The tubes, after having the forward ends thereof cut off by the saw 6, are rolled into the conveyor trough 7. At the end of the conveyor trough 7 is the first sizing roll 8, and the tubes are pushed from the conveyor trough 7 through the first sizing roll. In line with the pass of the first sizing rolls 8 is a central receiving conveyor or trough 9. At each side of the trough 9 and parallel therewith are troughs 10$^a$ and 10$^b$. A manipulator designated 11 is associated with the trough 9, and this manipulator can be operated to transfer the tubes from the center conveyor 9 to either of the parallel side troughs 10$^a$ and 10$^b$ alternately or continuously to any one of the two troughs 10$^a$ and 10$^b$. In line with the trough 10$^a$ is a pair of rolls 12$^a$, and in line with the trough 10$^b$ is a pair of rolls 12$^b$. The rolls 12$^a$ and 12$^b$ are carried on the same shafts, and both pairs of rolls 12$^a$ and 12$^b$ are operated from a common driving motor 13 in the usual lapweld manner. At 14$^a$ is a charging machine for forcing tubes from the trough 10$^a$ through the mill 12$^a$ and at 14$^b$ is a similar charging machine for forcing tubes through the mill 12$^b$.

Figure 4:
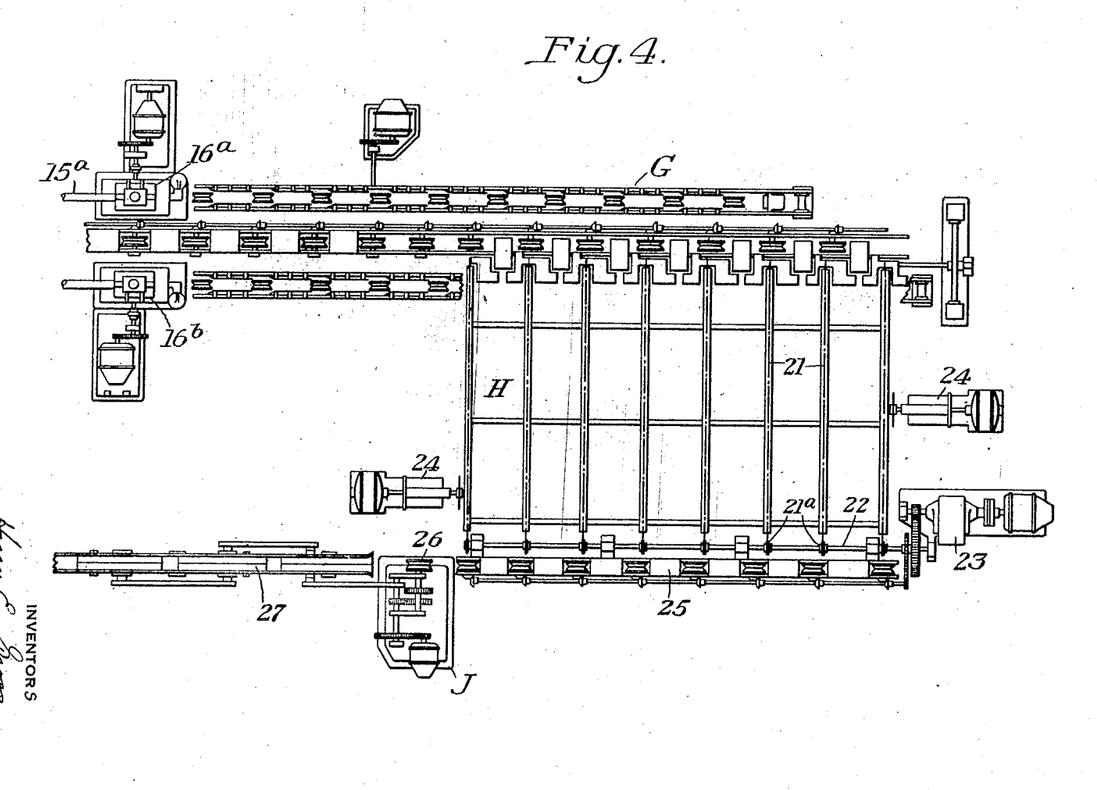
Figure 4 is a plan view on a larger scale showing the following part of the mill.
Figure 5:
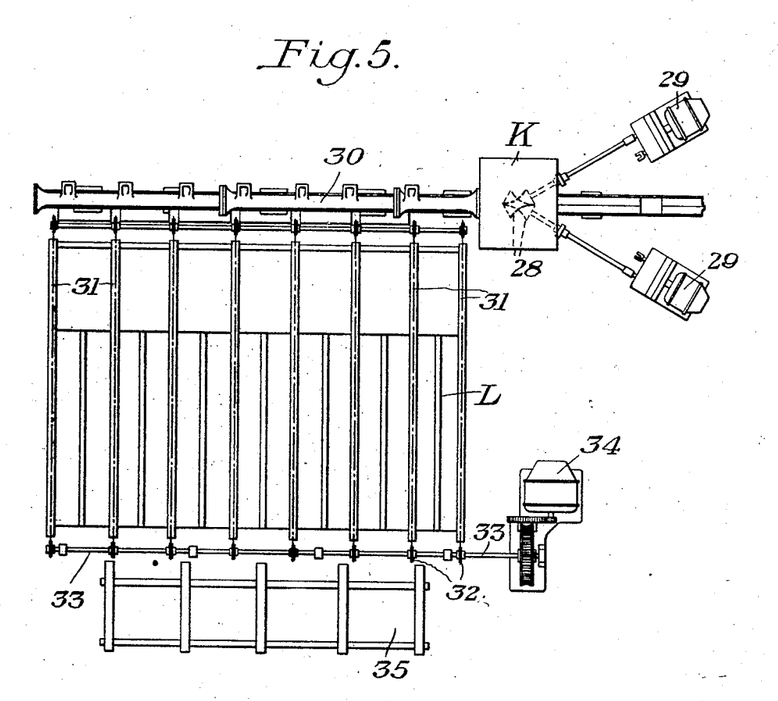
Figure 5 is a plan view on a larger scale showing the final part of the layout including the cross rolls and the cooling table.
Figure 6:
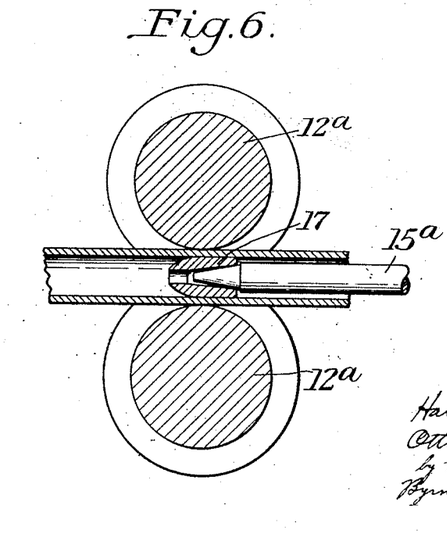
Figure 6 is a section view through one of the smoothing rolls comprising part of the apparatus illustrated in Figure 3.

The mills 12$^a$ and 12$^b$ are substantially similar to the so-called blister smoothing rolls of the lapweld process, each of these mills having a plug bar and pipe ball associated therewith. The plug bars for the rolls 12$^a$ and 12$^b$ are designated 15$^a$ and 15$^b$ respectively, and they are supported on rod or bar pulling machines of usual construction designated 16$^a$ and 16$^b$ respectively. The nature of the rolls 12$^a$ and 12$^b$, which are exactly similar, can be readily seen by reference to Figure 6 wherein the rolls 12$^a$ are shown in section. The plug bar 15$^a$ projects into the pass between the rolls in the usual way and the forward end of the bar carries the usual removable pipe ball 17. In line with the respective rolls 12$^a$ and 12$^b$ are receiving or runout troughs 18$^a$ and 18$^b$ respectively. The troughs 18$^a$ and 18$^b$ are tilting troughs which can be tilted to discharge tubes therein onto the supports 20, along which they roll into the central trough 19, but any suitable means for manipulating the tubes at this point may be employed. Interposed between the troughs 18$^a$ and 18$^b$ is a central conveyor 19. The conveyor 19 extends past the bar pullers 16$^a$ and 16$^b$ to the transfer rack H, which is arranged along one side of the end portions of this conveyor. The transfer rack is of any desired or preferred construction, and is preferably of the type wherein the pipes are conveyed across the rack by means of chains 21 passing around sprockets 21$^a$ and a shaft 22 driven from a motor 23. Cropping saws may be provided at each side of the rack and in staggered relation, as clearly illustrated in Figures 1 and 4. These saws are designated 24. At the opposite side of the cooling rack is a receiving trough or conveyor 25, and in line with the forward end of this conveyor is a second sizing roll 26. In line with the sizing roll 26 is a runout trough 27 at whose forward end is the usual cross roll unit K having two rolls 28 arranged diagonally to each other and to the trough; these rollers being driven in the usual way by motors 29. The arrangement of this unit K, which is common to the art, is clearly shown in Figure 5. In line with the cross roll unit K is a roll-off plate 30. This roll-off plate is arranged along the lower end of the cooling rack L, which is similar to the rack H and which preferably has transfer chains 31 thereon operated from sprockets 32 on a shaft 33 driven from a motor 34. This cooling table may discharge into a basket 35 or other receiving means.

In the preferred form of the mill, additional sizing rolls are provided for operation upon the tubes after they emerge from the smoothing rolls 12$^a$ and 12$^b$. In the usual lapweld process, it is a common practice to pass the tubes from the smoothing rolls through a pair of sizing rolls, but such sizing rolls have always been remotely located with respect to the smoothing rolls and have been arranged horizontally in the same way that the smoothing rolls are arranged. In view of the fact that the pipe, after coming through the smoothing rolls, have a slightly elliptical shape, it has heretofore been the practice in the lapweld process to rotate the tubes a quarter turn before passing them through the sizing rolls, after they have emerged from the smoothing rolls.

According to the present invention, sizing rolls are provided immediately back of the smoothing rolls 12$^a$ and 12$^b$. These rolls are designated 36$^a$ and 36$^b$ respectively. Instead of having the axes thereof horizontally disposed, the rollers are arranged vertically. It, therefore, becomes unnecessary to rotate the pipe a quarter turn as it emerges from the smoothing rolls 12$^a$ and 12$^b$. The plug bars 15$^a$ and 15$^b$, being of less diameter than the inside diameter of the pipe, extend between the passes of the respective sizing rolls 36$^a$ and 36$^b$.

From the foregoing, the operation of the mill can be easily traced. The pipe is butt-welded in the usual manner, as heretofore explained, but upon being released by the drawbench tong, it is brought under the action of the circular saw 6, which cuts off the tong end of the white hot pipe so that this end of the pipe will present a circular orifice. The pipe upon having the forward end cropped in this manner drops into the trough 7 and passes through the sizing roll H. The sizing roll machine 8, located at this point in the present mill, is of considerable advantage. It functions to size all tubes which are discharged from the drawbench which are of a diameter too small to be passed through the smoothing rolls 12$^a$ and 12$^b$, and in this event, the tubes, after emerging from the rolls 8 pass along the conveyor 9 directly to the central conveyor 19 and are discharged on to the transfer rack H. These tubes will have been sized by the roll 8 in the usual manner now practiced in buttweld processes. Other tubes, which are to be passed through the rolls 12ª or 12ᵇ, are not sized by these sizing rolls, the rolls merely acting as live rollers to guide pipe to the central conveyor 9, no reduction taking place in the outside diameter of the pipe. The manuiplator 11 then functions to transfer the tubes either to the troughs 10ª or 10ᵇ. From these troughs they are charged directly into the respective smoothing roll mills 12ª and 12ᵇ over the pipe balls 17 of the respective mills. The ball 17 serves to iron out any irregularities which may exist on the inside of the tubes and to maintain the proper diameter of the tubes while the outsides thereof are rolled by the respective rolls 12ª and 12ᵇ. The tubes pass from the rolls 12ª and 12ᵇ through the respective sizing rolls 36ª and 36ᵇ. In view of the fact that the pass of the smoothing rolls is slightly elliptical with the major axis in a horizontal direction, the sizing rolls are arranged at right angles to the smoothing rolls, as hereinbefore explained. The sizing rolls 36ª and 36ᵇ will therefore serve to round out the tubes without requiring that the tubes first be rotated 90° to change the position of the longer axis of their elliptical form.

After being passed through the rolling units 12ª and 12ᵇ and 36ª and 36ᵇ, the tubes are run out into the respective troughs 18ª and 18ᵇ. Upon withdrawal of the plug bar by operation of the bar pullers 16ª and 16ᵇ in accordance with the usual practice, the pipes are transferred back to the central conveyor 19. From the central conveyor, the tubes are discharged on to the transfer rack H, and are moved across this rack. If either or both ends of the tube require further trimming, this can be accomplished by the saws 24. The pipe, upon being discharged from the transfer rack H, falls into the conveyor 25 and is given its final sizing by the sizing roll machine 26. The tubes may then pass through the cross roll machine K which serves to remove any loose scale from the surface of the tubes after which the tubes can be slid from the roll-off plate onto the rack L and discharged into the basket 35 in a finished form ready for threading or such further treatment as may be desired.

Figure 1:
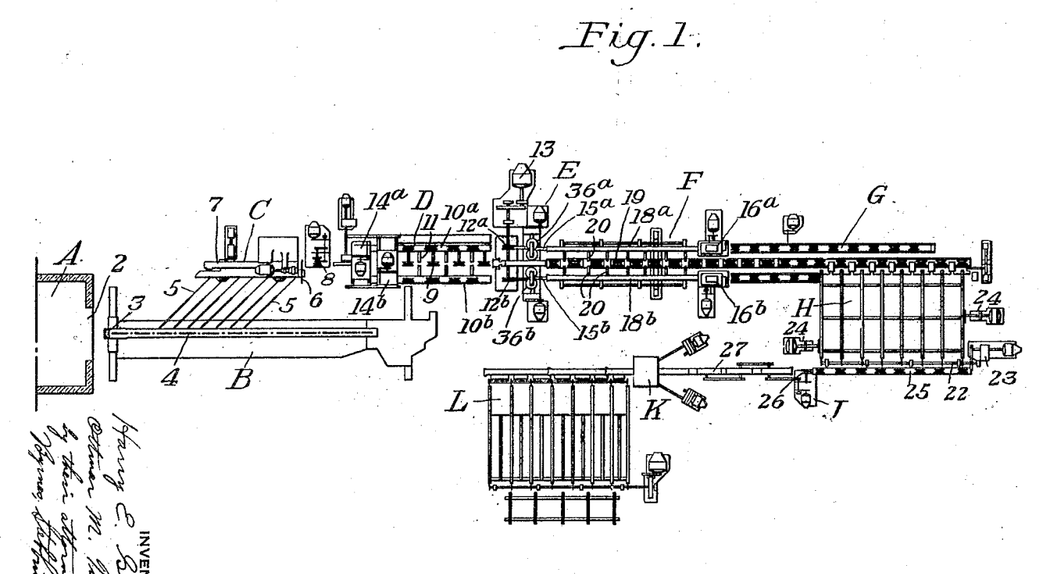
Figure 1 is a diagrammatic view illustrating the general layout of a mill for the manufacture of the buttweld tubing.
Figure 2:
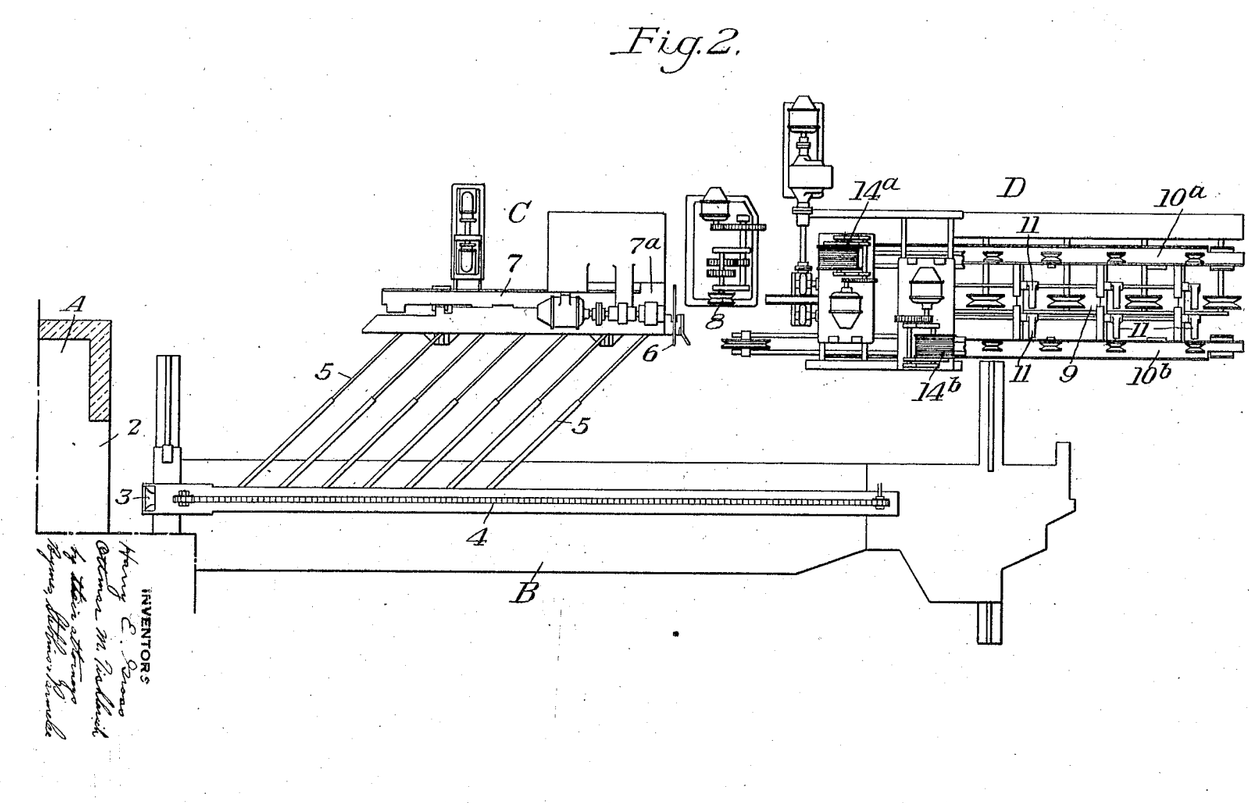
Figure 2 is a view on a larger scale of the forward portion of the mill illustrating diagrammatically the drawbench and the first portion of the finishing mechanism.
Figure 3:
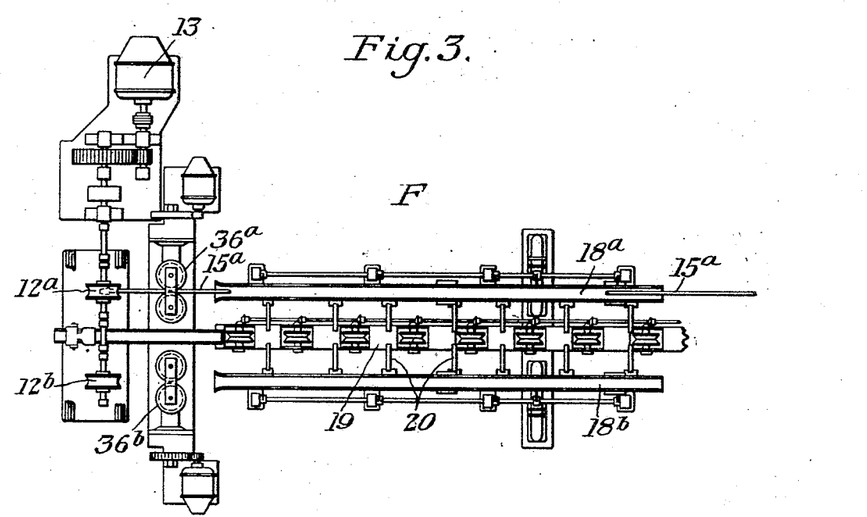
Figure 3 is a plan view on a larger scale showing diagrammatically that portion of the mill following the part shown in Figure 2.
Figure 9:
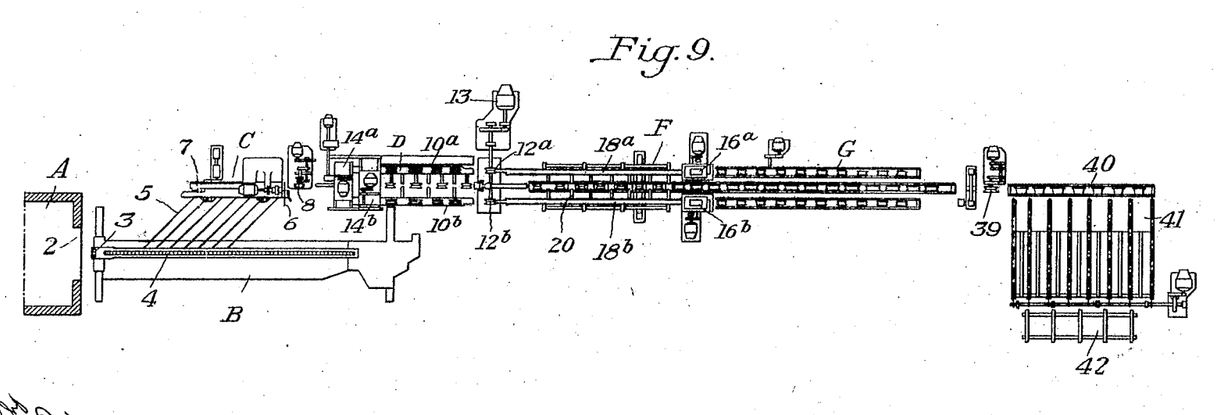
Figure 9 is a view similar to Figure 1 of a slightly modified arrangement.

Instead of being discharged onto a rack H, the arrangement shown in Figure 1 may be modified so as to locate the sizing roll, (corresponding to 36ª and 36ᵇ) at the end of the central conveyor 19. This arrangement is illustrated in Figure 9. The sizing roll is designated 39 and discharges into a roll-off plate 40 along a cooling rack 41. The rack 41 may discharge into a basket 42. In this arrangement provision for cross rolling is not shown, but could, of course, be provided. This layout is preferable to locating sizing rolls 36ª and 36ᵇ directly in line with the smoothing rolls 12ª and 12ᵇ from an operating standpoint. The use and location of these rolls is optional. For the sake of brevity the same reference numerals have been used in Figure 9 that have been used in Figure 1 to designate common parts in both figures.

It is believed that the advantages of the present method and apparatus will now be apparent. It has heretofore been pointed out that in the lapweld process it has been possible and has been the usual practice to pass the tubes over a pipe ball to smooth the interior as well as the exterior thereof, while it has always been the practice, in the bellweld method, to perform all of the operations, including as a final step the removal of both ends of the tube, then to inspect the tubes and reheat any that appear to require smoothing on the interior thereof and to pass the reheated tubes through a smoothing roll over a pipe ball. According to the present new method, the tong end of the pipe is immediately removed so that the tubes, while at white heat, can be passed directly through a smoothing roll having a pipe ball associated therewith. Reheating of the tube is thereby eliminated and it is possible to pass all of the tubes directly over the pipe ball in the initial operation whether they really need such smoothing or not. The step of moving such pipe to a lapweld mill is eliminated; the step of reheating is eliminated; the step of working such pipe in a lapweld mill is eliminated, while the production of finishing tubes over the smoothing rolls can be speeded up to equal the production of the bellweld method, and a more uniform product is assured by reason of fact that all of the tubes obtain the same treatment.

The arrangement of the mill is one wherein the tubes can be passed over smoothing rolls or not, depending upon the operation of the manipulator 11. Whenever it is desired to pass a tube only through the first sizing rolls and the final sizing rolls in accordance with the old practice, the tube is allowed to pass directly along the center of the mill without being transferred to either of the troughs 10ª or 10ᵇ. When this is done the tube is not passed over any pipe ball or through any smoothing roll which affects the interior thereof and production can be carried on in accordance with present methods. This is of considerable advantage in that it permits of by-passing tubes which are too small to be put through the smoothing rolls over the pipe ball and allows for the by-passing of any tubes which are defective. It also provides an arrangement wherein production of buttweld tubing can be continued even though some parts of the smoothing roll mechanism are not in operation. The particular advantage of the double arrangement of the smoothing rolls is that the operation of the smoothing rolls is relatively slow, as compared with the rapid production which can be obtained by the bellweld method. In the practice of the present invention the tubes will be alternately transferred to the side troughs 10ª and 10ᵇ so that the production from the drawbench can be handled without congestion and without allowing the tubes to become cold. Should the production from the drawbench exceed the quantity which the two mills 12ª and 12ᵇ can handle, then the excess can be passed straight through the mill and later smoothed.

While we have illustrated and described a preferred embodiment of the invention, it will be understood that this is merely by way of illustration and that the apparatus can be otherwise embodied within the contemplation of our invention.

We claim:

1. The method of manufacturing buttweld tubing which consists in drawing the skelp through a forming die at welding temperature, removing the tong end of the tube while it is still hot to bring the edges thereof into abutting relation and weld the same, and then passing the tube while still hot over a pipe ball between rolls.

2. The method of manufacturing buttweld tubing which consists in drawing a strip of skelp through a bell die at welding temperature to form the skelp into a tube in which the edges of the skelp abut and are welded, and then passing the tube through a pair of smoothing rolls over a pipe ball while the tube is still hot from the welding operation.

3. The method of forming tubing which consists in bringing the edges of a strip of metal together in abutting positions at welding temperature to produce a buttwelded tube, and then passing the tube through a pair of smoothing rolls and over a pipe ball while the same remains hot from the welding operation.

4. The method of forming tubing which consists in bringing the edges of a strip of metal together in abutting relation at welding temperature to produce a buttwelded tube, and then passing the tube through a pair of smoothing rolls and over a pipe ball while the same remains hot, then subsequently sizing the tube in a sizing roll mill.

5. The method of manufacturing buttweld tubing which consists in drawing a strip of skelp through a die at welding temperature to bring the edges of the strip into abutting relation and weld them together, cropping the tong end of the resulting tube while the same is still hot from the welding operation, passing the tube between smoothing rolls over a pipe ball while the same remains hot, and further subjecting the tube to the action of sizing rolls before the tube has become cold.

6. In the manufacture of buttweld tubes, the steps which consist in forming skelp into tubes by drawing the skelp at a welding temperature through a bell die by means of a drawbench whereby the edges of the skelp are brought into abutting relation and welded, transferring the welded tubes from the drawbench to a conveyor, passing the tubes along the conveyor and selectively directing them from the conveyor through one or the other of a pair of smoothing rolls having a pipe ball associated therewith, before the tubes have become cold and while they are still hot from the welding step, and which consists further in removing the tong ends of the tubes before the tubes are passed through the smoothing rolls.

7. Apparatus for the manufacture of butt-weld tubing including a drawbench unit for the manufacture of butt-welded tubes and a pair of smoothing rolls having a pipe ball in the pass thereof, means by which the butt-welded tubes are transferred from the drawbench unit to the smoothing rolls, while the tubes are still hot from the butt-welding operation, and a cropping saw operatively interposed between the drawbench and the smoothing rolls.

8. Apparatus for the manufacture of butt-weld tubes including a drawbench unit for forming butt-welded tubes, a trough for receiving tubes from the drawbench, a saw for removing the tong ends of the tubes as they pass from the drawbench to the trough and before the tubes are cold, and a smoothing roll apparatus having a pipe ball associated therewith to which the tubes are conducted from the trough while they are still hot from the butt-weld operation.

9. Apparatus for the manufacture of butt-weld tubes including a drawbench unit for forming butt-weld tubes, a trough for receiving tubes from the drawbench, a saw for removing the tong ends of the tubes as they pass from the drawbench to the trough, a smoothing roll apparatus having a pipe ball associated therewith to which the tubes are conducted from the conveyor, and a sizing roll machine following the saw and the smoothing rolls, all of said apparatus being arranged to permit the passage of the tube from the drawbench unit therethrough while it is still hot from the butt-welding operation.

10. Apparatus for the manufacture of butt-weld tubing including a drawbench unit for forming butt-welded tubes, means for receiving tubes from the drawbench unit comprising a central conveyor trough, a second trough parallel with the first, a manipulator for transferring tubes from the central conveyor to said second conveyor, and smoothing rolls having a pipe ball associated therewith to which the second conveyor delivers; and a runout trough for the smoothing rolls, all of said apparatus being arranged to operate upon the tube while it is still hot from the butt-welding operation.

11. Apparatus for the manufacture of butt-weld tubing from the skelp to a finished product at one heating of the metal, including a drawbench unit for forming butt-weld tubing, means for receiving tubes from the drawbench, comprising a central conveyor trough, a second trough parallel with the first and rearwardly thereof, a manipulator for transferring tubes from the central conveyor to said second conveyor, smoothing rolls having a pipe ball associated therewith to which the second conveyor delivers, and a runout trough for the smoothing rolls, said runout trough having a manipulator associated therewith for returning the tubes to the central trough, and a cooling rack to which the central trough delivers.

12. Apparatus for the manufacture of buttweld tubing including a drawbench unit for the manufacture of butt-welded tubes, means for receiving tubes from the drawbench, comprising a central conveyor trough, a second trough parallel with the first, a manipulator for transferring tubes from the central conveyor to said second trough, smoothing rolls having a pipe ball associated therewith to which the second conveyor delivers, and a runout trough for the smoothing rolls, said first conveyor having a saw associated therewith for removing the tong ends of the tubes before they are passed through the said sizing rolls.

13. Apparatus for the manufacture of buttweld tubing including a drawbench unit for the manufacture of butt-welded tubes, a conveyor for receiving tubes from the drawbench, a pair of smoothing rolls at each side of the said conveyor, said smoothing rolls having a pipe ball associated therewith, a conveyor in advance of each of the smoothing rolls parallel with said first conveyor, a manipulator for transferring tubes from the first conveyor to the other conveyors at each side thereof, and a saw for removing the tong ends of the tubes before they are passed through the said smoothing rolls.

14. Apparatus for the manufacture of buttweld tubing including a drawbench unit for the manufacture of butt-welded tubes, a conveyor for receiving tubes from the drawbench, a pair of smoothing rolls at each side of the said conveyor, said smoothing rolls having a pipe ball associated therewith, a conveyor in advance of each of the smoothing rolls parallel with said first conveyor, a manipulator for transferring tubes from the first conveyor to the other conveyors at each side thereof, a saw for removing tong ends of the tubes before they are delivered to said first conveyor, and a sizing roll unit associated with the central conveyor in advance of the manipulator.

15. The combination with a drawbench for forming butt-weld tubing, of means for completing the finishing operations of the tubes before they have cooled following the welding thereof, said means including a saw for removing the tong ends of the tubes immediately upon their discharge from the drawbench, a central conveyor into which the tubes are discharged, said conveyor having sizing rolls near its forward end and having a transfer rack adjacent its rear end, and having a smoothing roll unit at each side thereof intermediate its ends, said conveyor having a manipulator for transferring tubes from the central conveyor to either of the smoothing roll units, the smoothing roll units with pipe balls and bars for supporting the same having runout troughs associated therewith, manipulators for returning the tubes from the runout troughs of the respective smoothing roll units to the central conveyor, each of said smoothing roll units having a sizing roll unit associated therewith, said sizing roll units being arranged immediately in back of the smoothing rolls of each unit and having the axes of the rollers thereof at right angles to the axes of the smoothing rollers.

16. The combination with a drawbench for forming buttweld tubing, of means for completing the finishing operations of the tubes before they have cooled from the butt-welding operations, said means including a saw for removing the tong ends of the tubes immediately upon their discharge from the drawbench, a central conveyor into which the tubes are discharged, said conveyor having sizing rolls near its forward end and having a transfer rack adjacent its rear end, and having a smoothing roll unit at each side thereof intermediate its ends, said conveyor having a manipulator for transferring tubes from the central conveyor to either of the smoothing roll units the smoothing roll units having runout troughs associated therewith, manipulators for returning the tubes from the runout troughs of the respective smoothing roll units to the central conveyor, each of said smoothing roll units having a sizing roll unit associated therewith, said sizing roll units being arranged immediately in back of the smoothing rolls of each unit and having the axes of the rollers thereof at right angles to the axes of the smoothing rollers, each of said smoothing roll units having a plug bar associated therewith which extends between the pass in the sizing rolls and supports a ball in the pass of the smoothing rolls, said plug bars being supported at the ends of the runout troughs of the respective units.

17. In an apparatus for forming finishing buttweld tubes from a single heating of the skelp the combination with a drawbench for the manufacture of buttweld tubing of means for receiving the tubes therefrom and finally completing them before they have cooled from the butt-welding process, said means comprising a series of units to which the tubes are successively passed, said units comprising a saw, a conveyor for receiving the tubes that have been sawed, a sizing roll, a central conveyor in line with the sizing roll, a pair of conveyors at each side of the central conveyor, a manipulator for transferring tubes from the central conveyor to either of the side conveyors, a smothing roll unit at the rear end of each of the side conveyors, said smoothing roll unit having a pipe ball mechanism associated therewith, a receiving trough for each of the receiving roll units at each side of the central conveyor, a manipulator for transferring the tubes from the receiving troughs to the central conveyor, a final sizing roll unit to which the tubes are delivered from the said central conveyor, a cooling rack for receiving the tubes after they have passed through the said final sizing roll unit, and cross rolls interposed between the final sizing roll and the cooling rack.

18. The method of forming and finishing buttweld tubing by a single heating of the skelp which consists in drawing the skelp through a bell die along a drawbench from a furnace to form a butt-welded tubing, removing the tong end of the tubing, then subjecting the tubing before it becomes cold to the successive action of smoothing rolls having a pipe ball associated therewith, sizing rolls and cross rolls.

19. The method of forming and finishing buttweld tubes with a single heating of the skelp which consists in drawing successive pieces of skelp through a bell die to bring the edges of the skelp into abutting relation and weld them, removing the tong ends of the resulting tubes while same are hot and selectively passing the tubes through any one of different smoothing roll units having pipe balls associated therewith whereby the drawbench can be operated at maximum capacity and the tubes completed before they become cold.

In testimony whereof we have hereunto set our hands.

HARRY E. GROSS.
OTTMAR M. TISHLARICH.